US012560021B2

United States Patent
(12) United States Patent
Alarcon

(10) Patent No.: US 12,560,021 B2
(45) Date of Patent: Feb. 24, 2026

(54) VAULT LOCK SYSTEM AND VAULT OR SAFE EQUIPPED WITH THE VAULT LOCK SYSTEM

(71) Applicant: Miguel Alarcon, Doral, FL (US)

(72) Inventor: Miguel Alarcon, Doral, FL (US)

( * ) Notice: Subject to any disclaimer, the term of this patent is extended or adjusted under 35 U.S.C. 154(b) by 128 days.

(21) Appl. No.: 18/583,015

(22) Filed: Feb. 21, 2024

(65) Prior Publication Data

US 2024/0279980 A1 Aug. 22, 2024

Related U.S. Application Data

(60) Provisional application No. 63/447,501, filed on Feb. 22, 2023.

(51) Int. Cl.
*E05G 1/026* (2006.01)
*E05B 65/00* (2006.01)

(52) U.S. Cl.
CPC .......... *E05G 1/026* (2013.01); *E05B 65/0075* (2013.01)

(58) Field of Classification Search
CPC ....... E05B 65/0075; E05G 1/02; E05G 1/026; E05G 1/04
See application file for complete search history.

(56) References Cited

U.S. PATENT DOCUMENTS 4,158,337 A * 6/1979 Bahry ..................... E05G 1/026 292/259 R
4,754,715 A * 7/1988 Squires ............... E05B 65/0075 292/41
5,094,483 A * 3/1992 James ................. E05B 65/0075 109/59 R
5,784,973 A * 7/1998 Mercer ................. E05B 15/108 70/120
6,089,168 A * 7/2000 Dunlap ................... E05G 1/026 292/159
6,907,830 B2 * 6/2005 Guinan ................. E05C 19/001 292/341.15
6,971,322 B2 * 12/2005 DuBois ..................... G07F 9/10 70/1.5
7,641,106 B1 * 1/2010 Kovacs ................. G07F 19/205 902/8
8,166,706 B2 5/2012 Slimak et al.
8,171,866 B2 5/2012 Dunstan
8,347,665 B2 * 1/2013 Rasmussen ......... E05B 65/0075 70/91

(Continued)

*Primary Examiner* — Kristina R Fulton
*Assistant Examiner* — Noah Horowitz
(74) *Attorney, Agent, or Firm* — Katten Muchin; ROSENMAN LLP

(57) ABSTRACT

A vault with a vault lock system is provided to securely keep valuables in the vault. The vault includes a chamber having an interior space and an opening and a vault door installed at a periphery of the opening of the chamber and configured to securely close the interior space of the chamber. The chamber includes a pair of side walls and an end portion of one of the side walls has a first recess. The vault door includes a rear panel and a front slab slide-ably coupled to the rear panel. A first edge portion of the front slab is configured to fit into the first recess at the engaged position. The vault includes at least one hinge coupling the vault door to the chamber to open or close the interior space of the chamber with the vault door.

19 Claims, 6 Drawing Sheets

(56) References Cited

U.S. PATENT DOCUMENTS

| | | | | |
|---|---|---|---|---|
| 8,469,408 | B2 * | 6/2013 | Li | E05C 19/001 292/37 |
| 9,238,929 | B2 * | 1/2016 | Cho | E06B 3/36 |
| 9,540,843 | B2 * | 1/2017 | Garrett | E05B 15/102 |
| 9,562,379 | B2 * | 2/2017 | Olsen | E05C 9/06 |
| 11,473,361 | B1 | 10/2022 | Sisco et al. | |

* cited by examiner

VAULT LOCK SYSTEM AND VAULT OR SAFE EQUIPPED WITH THE VAULT LOCK SYSTEM

CROSS-REFERENCE TO RELATED APPLICATION

This application claims the benefit under 35 U.S.C. § 119(e) of provisional patent application No. 63/447,501, filed Feb. 22, 2023, the contents of which are hereby incorporated by reference.

BACKGROUND

On a typical safe or vault that is constructed to store valuables, the locking mechanism consists of an extendable bolts or bars which will go from an open position to a lock position, which locks the safe or the vault door. A combination lock may be coupled to the extendable bolts or bars. The combination lock, when locked, prevents the extendable bolts or bars from being operated to the open position.

SUMMARY

The disclosed invention is directed to a vault lock system and a vault or safe equipped with the vault lock system, which is constructed to keep valuables more securely in a vault or safe to prevent them from being stolen or damaged. In the vault or safe of the disclosed invention, the entire door slab works as the vault lock system, sliding to a closed position and to an open position. A combination lock or any type of lock is employed to prevent the door slab from moving in any direction. The vault and vault lock system of the disclosed invention remove the extendable bolt mechanism and provide more secure storage of valuables in the vault or safe.

These advantages and others are achieved, for example, by a vault that includes a chamber having an interior space and at least one opening and at least one vault door coupled to the chamber to open or close the interior space of the chamber through the at least one opening. The chamber includes a first wall and a second wall defining the at least one opening and an end portion of the first wall includes a first recess. The at least one vault door includes a rear panel and a front slab slidably coupled to the rear panel. A first edge portion of the front slab is configured to fit into the first recess at a closed and engaged position, and the front slab is configured to completely cover the at least one opening of the chamber at the closed and engaged position.

An end portion of the second wall may include a second recess, and a second edge portion of the front slab may be configured to fit into the second recess at a closed and disengaged position. The front slab may be configured to engage the first edge portion with the first recess while the second edge portion is partially engaged with the second recess, and may be configured to engage the second edge portion with the second recess while the first edge portion is disengaged from the first recess. The vault may further include at least one hinge for coupling the at least one vault door to the chamber to open or close the interior space of the chamber. The hinge may be placed at the second wall. The rear panel may be configured to be placed inside the interior space at the closed and engaged position. The vault may further include a guider installed in the rear panel and/or the front slab. The guider is configured to guide a movement of the front slab relative to the rear panel. The vault may further include a handle installed in the vault door and coupled to the guider to drive the movement of the front slab relative to the rear panel. The guider may include a gear rack and a pinion gear coupled to the gear rack and the handle. The vault may further include at least one lock system installed in the rear panel and/or the front slab, and configured to lock or unlock the movement of the front slab relative to the rear panel.

These advantages and others are achieved, for example, by a vault door system coupled to a chamber to open or close an interior space of the chamber. The chamber may include a first wall and a second wall defining an opening to the interior space and having a first recess at an end portion of the first wall and a second recess at an end portion of a second wall. The vault door system includes a rear panel, a front slab slidably coupled to the rear panel, and a guider installed in the rear panel and/or the front slab. A first edge portion of the front slab is configured to fit into the first recess at the closed and engaged position. A second edge portion of the front slab is configured to fit into the second recess at the closed disengaged position. The front slab is configured to completely cover the opening of the chamber at a closed and engaged position. The guider is configured to guide a movement of the front slab relative to the rear panel.

BRIEF DESCRIPTION OF THE DRAWINGS

The preferred embodiments described herein and illustrated by the drawings hereinafter are to illustrate and not to limit the invention, where like designations denote like elements.

DETAILED DESCRIPTION

Figure 1:
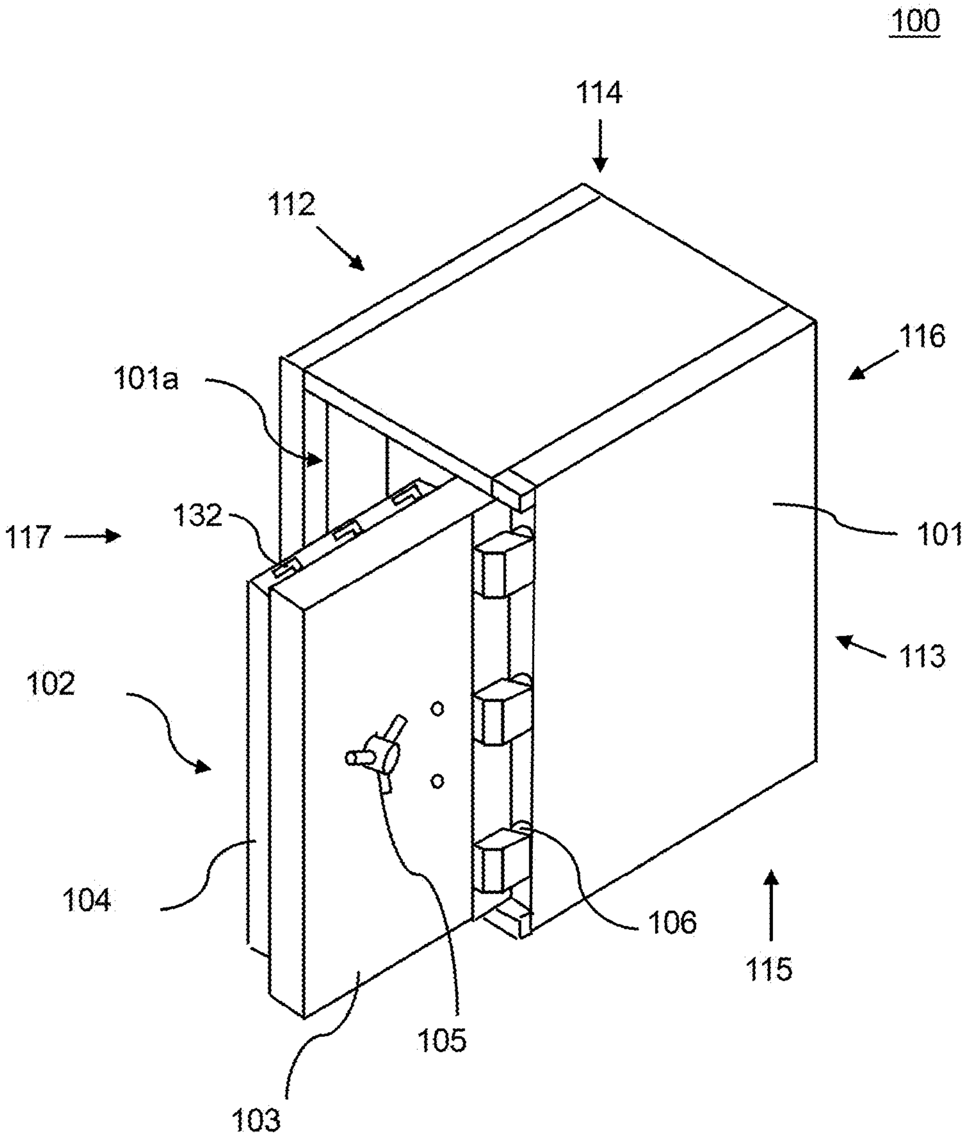
FIG. 1 is a perspective view of a vault of the disclosed invention which includes a vault door and a vault lock system employed in the vault door.

The following detailed description is merely exemplary in nature and is not intended to limit the described embodiments or the application and uses of the described embodiments. All of the implementations described below are exemplary implementations provided to enable persons skilled in the art to make or use the embodiments of the disclosure and are not intended to limit the scope of the disclosure, which is defined by the claims. It is also to be understood that the drawings included herewith only provide diagrammatic representations of the presently preferred structures of the present invention and that structures falling within the scope of the present invention may include structures different than those shown in the drawings.

With reference to FIG. 1, shown is a perspective view of a vault 100 of the disclosed invention which includes a vault door 102 in which a vault door and a vault lock system are combined. The vault 100 includes a chamber 101, which has an interior space 101*b* to store valuables and at least one opening 101*a* that allows access into the interior space 101*b*, and vault door 102 to open or close the interior space 101*b* of the chamber 101. In the exemplary embodiment shown in FIG. 1, for description purpose, the vault 100 is a box shape structure, having side walls 112, 113, a top wall 114, bottom wall 115, a rear wall 116 and an opening 101*a* on the front side 117. In another embodiment, the vault 100 may have a front wall at the front side 117, opposite side of the rear wall 101*e*, and the opening 101*a* may be formed on the front wall. The shape of the vault 100 is not limited to the box shape but can have any other shapes. Vault door 102 is installed at a periphery of the opening 101*a* of the chamber 101. The vault door 102 is constructed to securely close the interior space of the chamber 101. Vault 100 includes at least one hinge 106 coupling the vault door 102 to the chamber 101 so that the vault door 102 rotates or moves via the hinge 106 to open or close the interior space 101*b* of the chamber 101.

Figure 2:
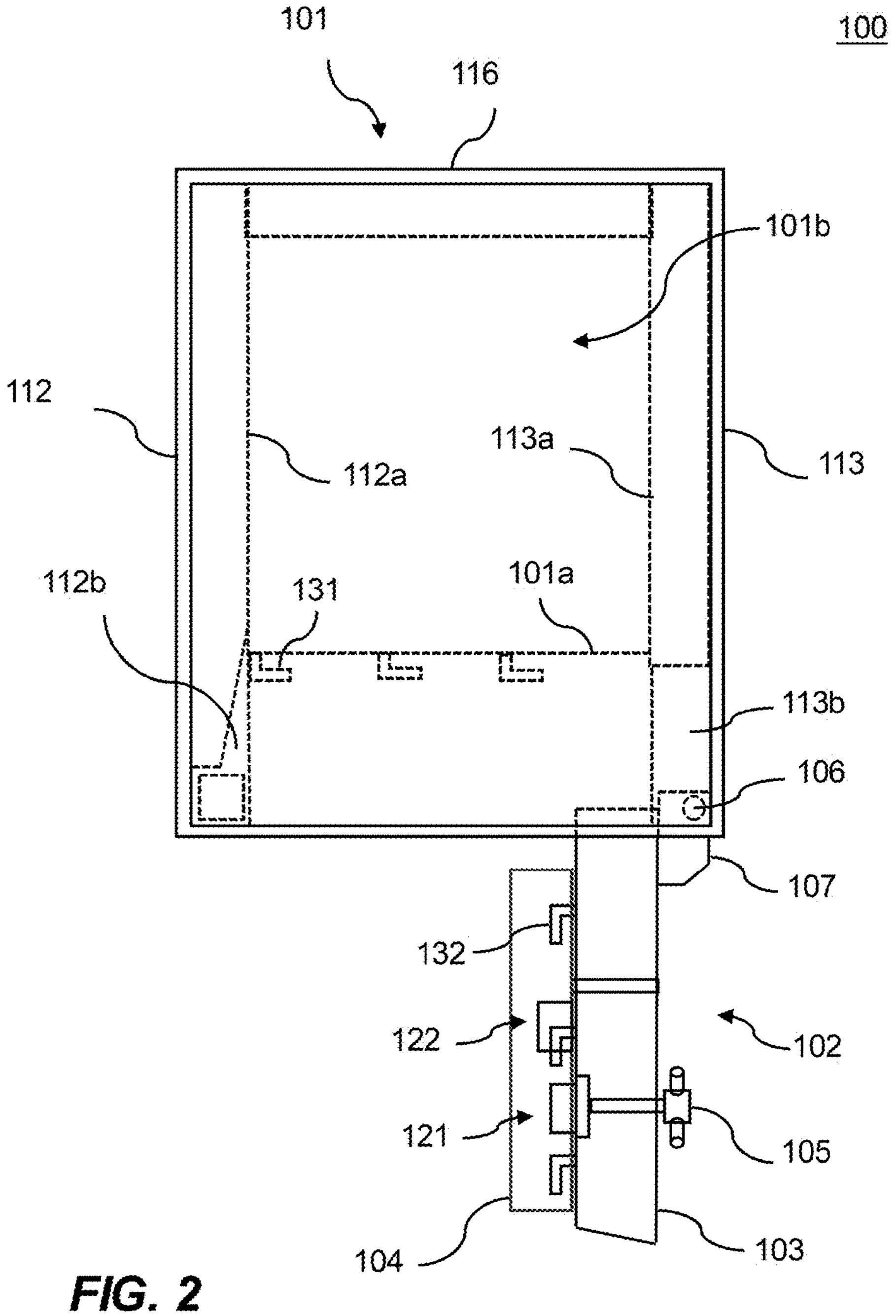
FIG. 2 is a top plan view of the vault when the vault door is open.
Figure 3:
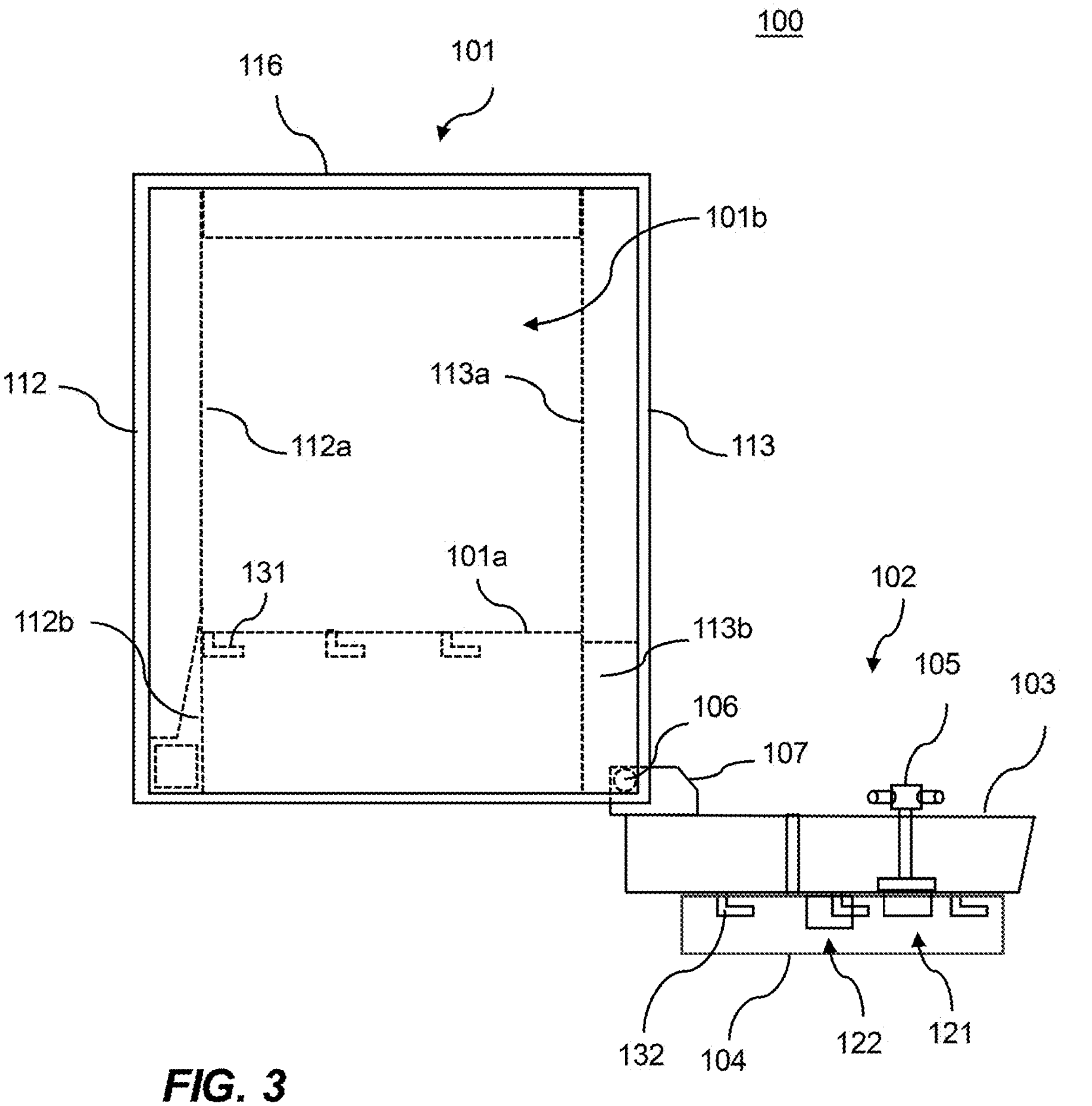
FIG. 3 is a top plan view of the vault when the vault door is widely open.
Figure 5:
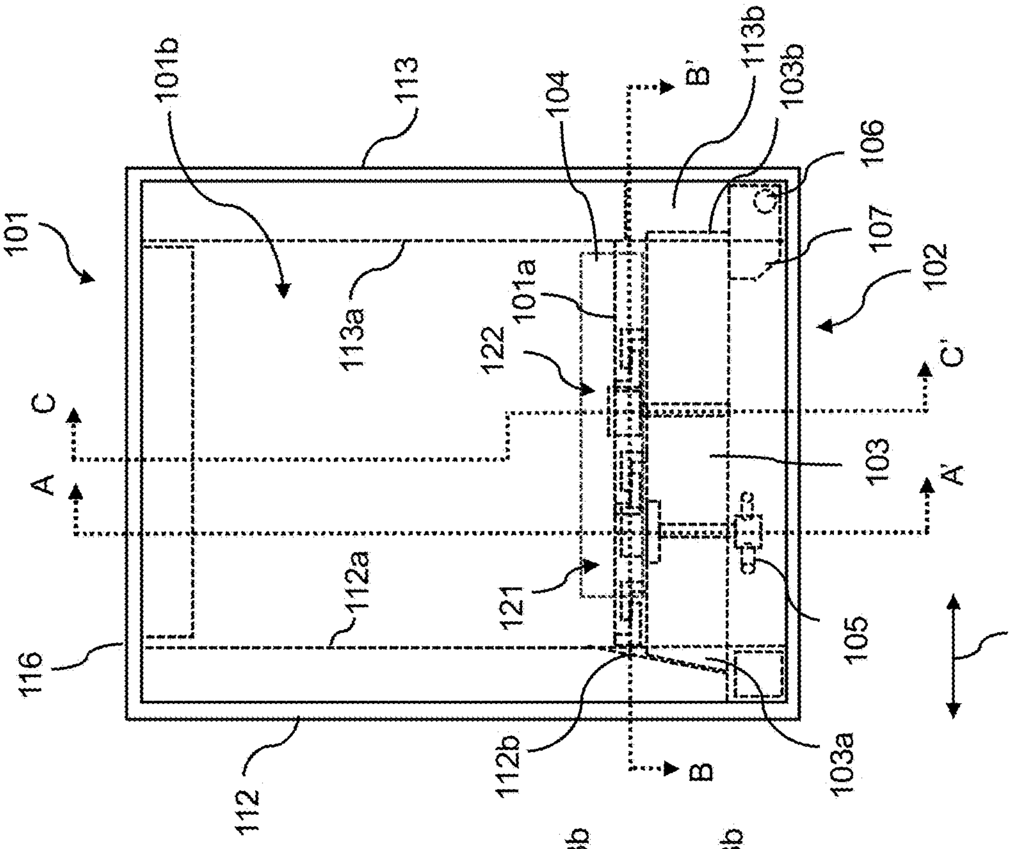
FIG. 5 is a top plan view of the vault when the vault door is closed and is at an engaged position.
Figure 4:
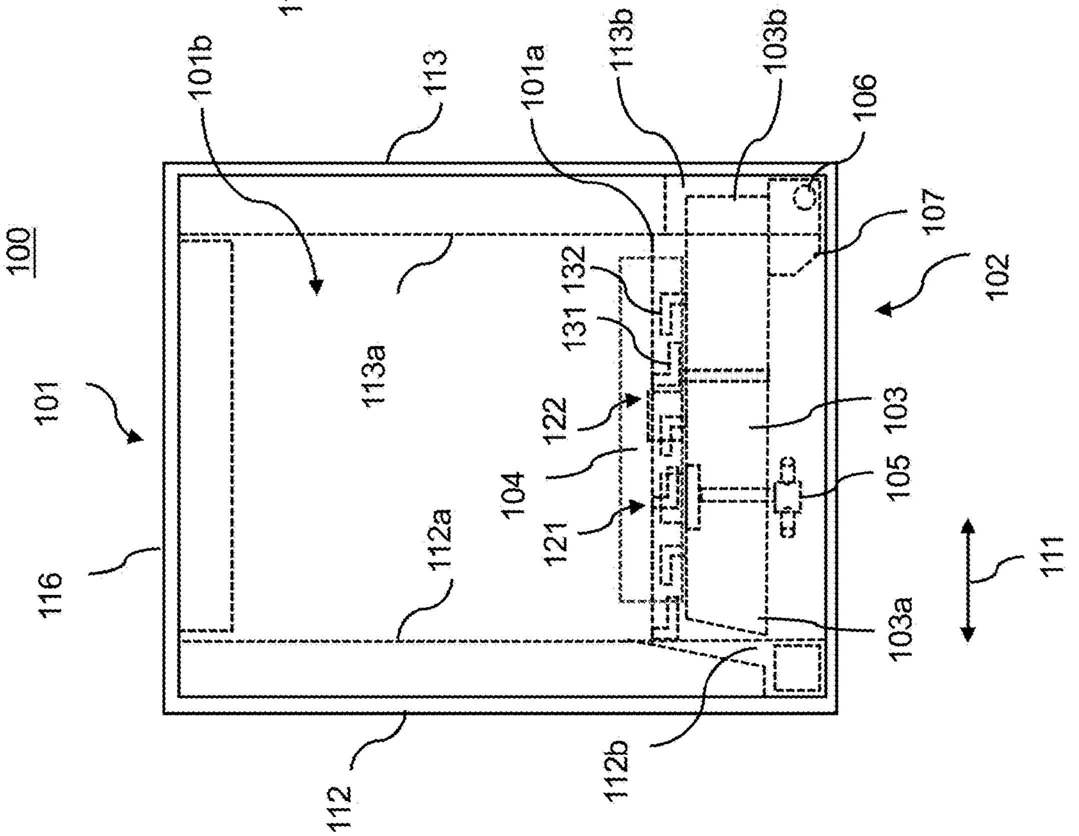
FIG. 4 is a top plan view of the vault when the vault door is closed but is at a disengaged position.
Figure 7:
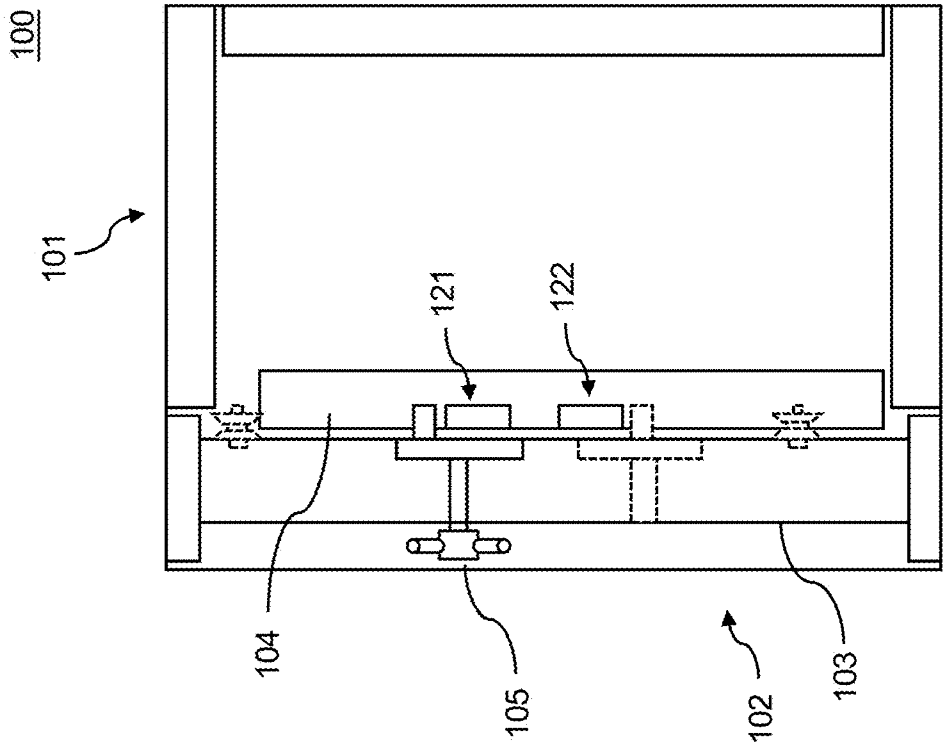
FIG. 7 is a cross sectional view of the vault along line A-A' in FIG. 5.
Figure 6:
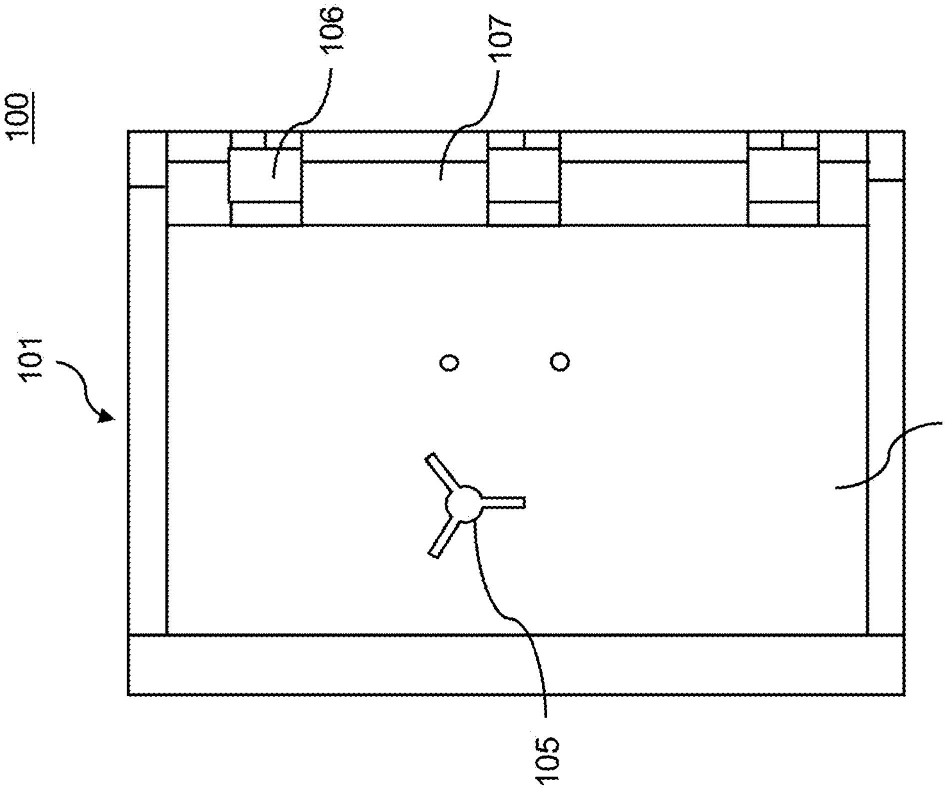
FIG. 6 is a front view of the vault when the vault door is closed.
Figure 9:
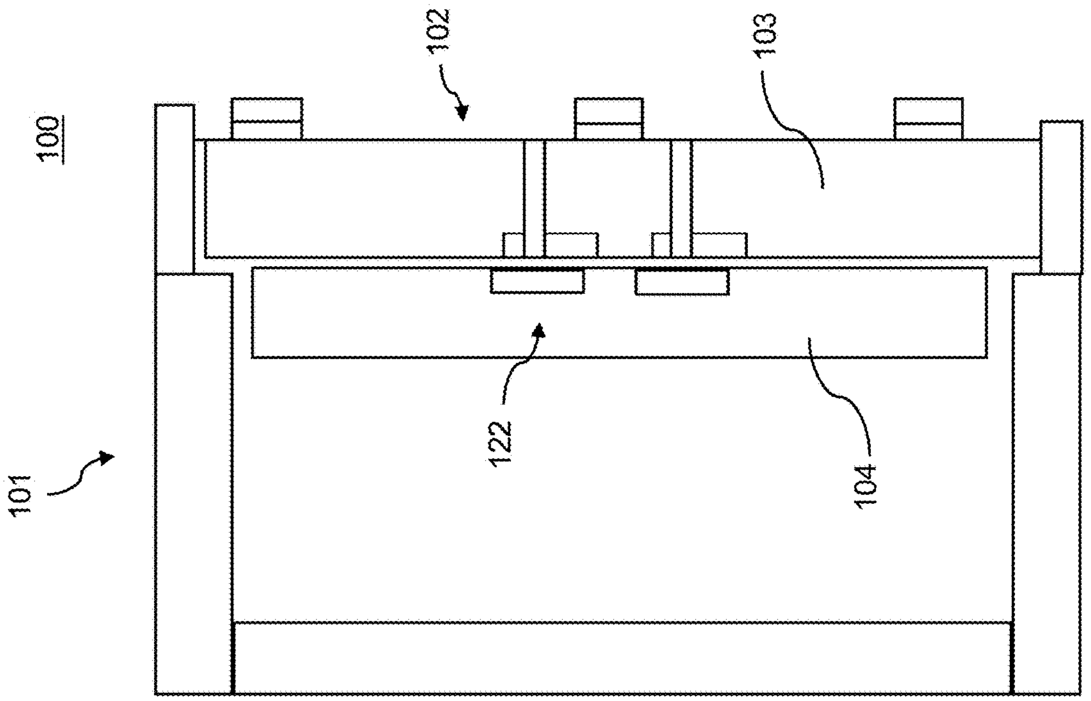
FIG. 9 is a cross sectional view of the vault along line C-C' shown in FIG. 5.
Figure 8:
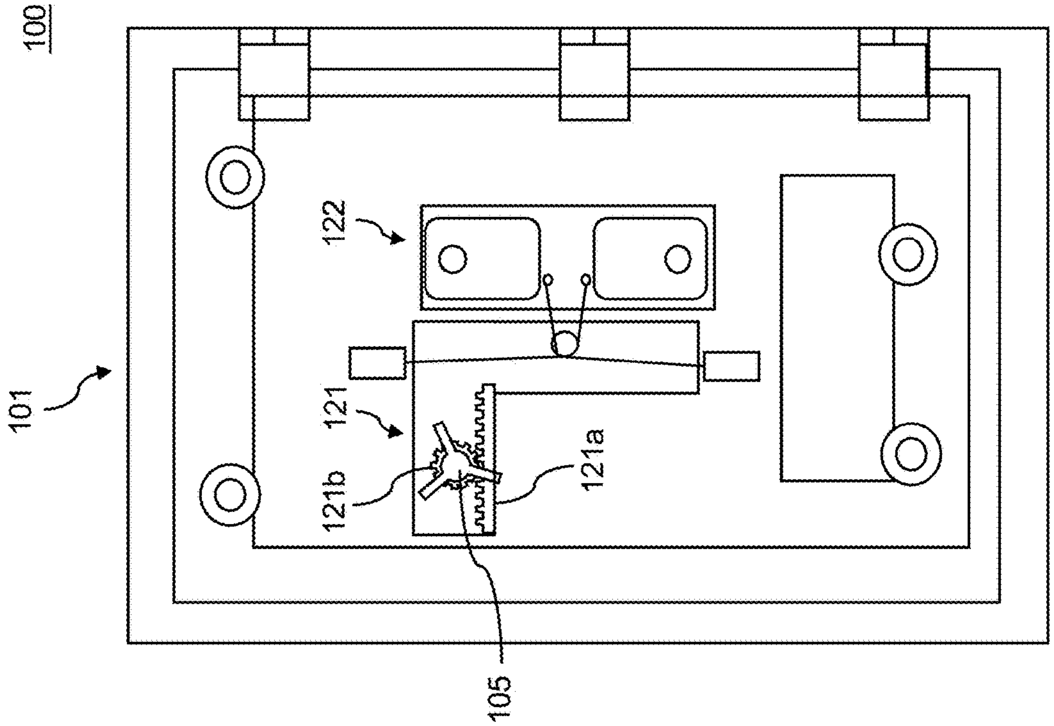
FIG. 8 is a cross sectional view of the vault along line B-B' shown in FIG. 5.

With reference to FIG. 2, shown is a top plan view of the vault 100 when the vault door 102 is open. With reference to FIG. 3, shown is a top plan view of the vault 100 when the vault door 102 is widely open. With reference to FIG. 4, shown is a top plan view of the vault 100 when the vault door 102 is closed but is at a disengaged position. With reference to FIG. 5, shown is a top plan view of the vault 100 when the vault door 102 is closed and at an engaged position. With reference to FIG. 6, shown is a front view of the vault 100 when the vault door 102 is closed. With reference to FIG. 7, shown is a cross sectional view of the vault 100 along line A-A' in FIG. 5. With reference to FIG. 8, shown is a cross sectional view of the vault 100 along line B-B' shown in FIG. 5. With reference to FIG. 9, shown is a cross sectional view of the vault 100 along line C-C' shown in FIG. 5.

Referring to FIGS. 2-9, the vault door 102 is constructed to include a rear panel 104 and a front slab 103 slidably coupled to the rear panel 104. The front slab 103 is configured to slide substantially parallel to the rear panel 104. For example, when the vault door 102 is closed, as shown in FIGS. 4-5, the front slab 103 slides along direction 111 relative to the rear panel 104. The direction 111 is substantially parallel to the wide surface of the front slab 103 that covers the opening 101*a*. The sliding movement of the front slab 103 relative to the rear panel 104 may be controlled by the handle 105. While the vault door 102 is being opened, the front slab 103 and the rear panel 104 together rotate via the hinge 106, as shown in FIGS. 1-2. The vault door 102 may be opened as shown in FIG. 2, and may be widely opened as shown in FIG. 3. When the vault door 102 is closed as shown in FIGS. 4-5, the rear panel 103 may be placed inside the interior space 101*b*, while the front slab 103 may be placed on outside of the periphery of the opening 101*a* to cover the opening 101*a*.

Herein, terms for the positions of the vault door 102 are defined as follows. The vault door 102 is at an open position when the vault door 102 is opened allowing access into the interior space 101*b* as shown in FIGS. 2-3. The vault door 102 is at a closed position when the vault door 102 closes the opening 101*a*, substantially or completely covering the opening 101*a*, as shown in FIGS. 4-5. The vault door 102 and the front slab 103 are at a disengaged position when the vault door 102 is at the closed position but the front slab 103 is not engaged with the recess 112*b* of the side wall 112 as shown in FIG. 4, in which the vault door 102 may substantially cover the opening 101*a* and is ready to be opened or engaged with the recess 112*b*. The vault door 102 and the front slab 103 are at an engaged position when the vault door 102 is at the closed position and the front slab 103 is engaged with the recess 112*b* of the side wall 112 as shown in FIG. 5, in which the vault door 102 completely covers the opening 101*a*.

The front slab 103 is configured to move between a disengaged position as shown in FIG. 4 and an engaged position as shown in FIG. 5 by a sliding movement. In the engaged position of the vault door 102, the front slab 103 completely and securely covers the opening 101*a* of the chamber 101. The front slab 103 has dimensions such that the wide area of the front slab 103, which faces the opening 101*a* at a closed position, is larger than the area of the opening 101*a*, enabling the front slab 103 to completely cover the opening 101*a*. The front slab 103 of the vault door 102 and the top wall 114, bottom wall 115, side walls 112, 113, and rear wall 116 of the chamber 101 may be walls or plates made of, for example, metal materials to provide secure storage of valuables inside the vault 100, preventing damages and breakage.

The vault door 102 includes at least one guider 121 that is configured to guide the sliding motion of the front slab 103 relative the rear panel 104. The guider 121 may be installed in the rear panel 104 and/or in the front slab 103, and slidably couples the front slab 103 to the rear panel 104. The vault door 102 includes a handle 105 that may be coupled to the guider 121 to drive or initiate a movement of the front slab 103 relative to the rear panel 104. The handle 105 may be installed at the front slab 103. The handle 105 is coupled to the guider 121 so that when the handle 105 is operated, the front slab 103 moves along the direction 111 relative to the rear panel 104. The handle 105 may be operated with rotational movements such as clockwise and counterclockwise rotations. In an embodiment, as shown in FIG. 8, the guider 121 may include gear rack 121*a* and pinion gear 121*b* engaged with the gear rack 121*a*. The handle 105 is connected to the pinion gear 121*b*, and the rotational movement of the handle 105 produces a linear motion of the front slab 103 through the pinion gear 121*b* and the gear rack 121*a*. However, the vault door 102 may employ different types of handles and guiders that have the capability of providing the sliding movement of the front slab 103 relative to the rear panel 104. For example, the handle 105 may be configured to be operated in a linear motion or any other movements rather than the rotational movement, still providing a sliding motion of the front slab 103 relative to the rear panel 104. In this case, the guider 121 may include proper mechanical elements that produce a sliding motion of the front slab 103 by the operation of the handle 105.

The handle 105 is configured to operate the vault door 102 between the engaged position and the disengaged position, and the guider 121 is to provide a movement of the front slab 103 relative to the rear panel 104 based on the operations of the handle 105. Any structures or elements may be employed for the handle 105 and guider 121 to achieve these utilities of the handle 105 and the guider 121. The vault door 102 may further include supporters (not shown) to support the front slab 103 and the rear panel 104 while the front slab 103 is moving relative the rear panel 104.

The vault door 102 further includes at least one lock system 122 that is configured to lock or unlock the relative movement between the front slab 103 and the rear panel 104. The lock system 122 may be coupled to the guider 121 and/or the handle 105 to perform the lock and unlock mechanisms of the relative movement between the front slab

103 and the rear panel 104. The lock system 122 is configured such that when locked, the sliding movement of the front slab 103 is prevented, and when unlocked, the sliding movement of the front slab 103 is enabled. In other words, the sliding movement of the front slab 103 relative to the rear panel 104 is allowed only when the lock system 122 is unlocked. The lock system 122 may include a combination lock or key lock. However, any types of locks or lock systems may be employed for the lock system 122 to lock or unlock the relative movement between the front slab 103 and the rear panel 104.

In operations, a user may operate the handle 105 to slide the front slab 103 to the engaged position as shown in FIG. 5. Then a user may operate the lock system 122 to lock the front slab 103 at the engaged position, preventing any movement of the front slab 103 relative to the rear panel 104, consequently locking the vault door 102. At this locked state, the front slab 103 cannot be moved from its position until the user operates the lock system 122 to unlock the vault door 102. When the lock system 122 is unlocked, the front slab 103 is allowed to be moved to the disengaged position as shown in FIG. 4. In an embodiment, the lock system 122 may be configured to be able to lock the front slab 103 at any position relative to the rear panel 104, so that whenever the lock system 122 is locked, the movement of the front slab 103 relative to the rear panel 104 is prevented. Therefore, the front slab 103 may be locked at any position between the completely engaged position and completely disengaged position.

Referring FIGS. 4-5, the front slab 103 is configured to slide along the direction 111 between the side walls 112 and 113. One of the side walls 112 and 113 is configured to be engaged with the front slab 103 at the engaged position of the front slab 103 as shown in FIG. 5. The other side wall is configured to be engaged with the front slab 103 at the disengaged position of the front slab 103 as shown in FIG. 4. FIGS. 4-5 exemplarily show that the side wall 112 is engaged with the front slab 103 at the engaged position of the vault door 102 and the side wall 113 is completely engaged with the front slab 103 at the disengaged position of the vault door 102. The inner surface 112*a* of the side wall 112 has a recess 112*b* at an end portion of the side wall 112 which is located outside the interior space 101*b*. The front slab 103 has a first edge portion 103*a* and a second edge portion 103*b* at the opposite side of the first edge portion 103*a*. As shown in FIG. 5, when the front slab 103 is slid to the engaged position, the first edge portion 103*a* is configured to slide into the recess 112*b* formed on the inner surface 112*a* of the side wall 112. The shapes of the recess 112*b* and the first edge portion 103*a* are formed to be matched with one another so that the first edge portion 103*a* of the front slab 103 is configured to fit into the recess 112*b* of the side wall 112 in the engaged position.

The inner surface 113*a* of the side wall 113 has a recess 113*b* at an end portion of the side wall 113 which is located outside the interior space 101*b*. As shown in FIG. 4, when the front slab 103 is slid to the disengaged position, the second edge portion 103*b* is configured to slide into the recess 113*b* of the side wall 113, while the first edge portion 103*a* is disengaged from the recess 112*b* of the side wall 112. When the first edge portion 103*a* is engaged with the recess 112*b* at the engaged position, the second edge portion 103*b* is partially engaged with the recess 113*b*, so that the front slab 103 completely covers the opening 101*a* of the chamber 101 without any gap into the interior space 101*b* of the container 101 from the outside. The partial engagement of the second edge portion 103*b* means that the second edge portion 103*b* may not completely occupy the recess 113*b*. In other words, in the partially engaged state, the second edge portion 103*b* leaves some space in the recess 113*b* which is not occupied by the second edge portion 103*b*. The shapes of the recess 113*b* and the second edge portion 103*b* are formed to be matched with one another so that the second edge portion 103*b* of the front slab 103 is configured to fit into the recess 113*b* of the side wall 113 of in the disengaged position of the vault door 102.

The vault 100 may include door guider 107 connected to the hinge 106 to further support the movement of the front slab 103 relative to the rear panel 104 and to support the vault door 102 when the vault door 102 is opened or closed via the hinge 106. As shown in FIGS. 2-5, one side or portion of the door guider 107 is coupled to the hinge 106 to support the rotational movement of the vault door 102 via the hinge 106, and another side or portion of the door guider 107 may be coupled to the front slab 103 to support the sliding movement of the front slab 103. The door guider 107 may be coupled to the front slab 103 with mechanical elements to support the vault door 102 and to smoothly guide the sliding motion of the front slab 103. The vault 100 may include one or more tab/slot structures 131, 132 to further support the movement of the front slab 103 relative to the rear panel 104 and to support the vault door 102 at the locked state. One tab/slot 131 may be formed at the periphery of the opening 101*a* of the container 101 outside the interior space 101*b*, and the other tab/slot 132 may be formed at the front slab 103. When the front slab 103 is in the engaged position as shown in FIG. 5, the tab/slots 131, 132 are engaged with one another. When the front slab 103 is in the disengaged position as shown FIG. 4, the tab/slots 131, 132 are disengaged. If one tab/slot 131 is a tab and the other tab/slot 132 is slot, and vice versa. However, the tab/slot structures 131, 132 are not limited to tabs and slots, but any different types of mechanisms may be employed for the tab/slot structures 131, 132.

Since many modifications, variations, and changes in detail can be made to the described preferred embodiments of the invention, it is intended that all matters in the foregoing description and shown in the accompanying drawings be interpreted as illustrative and not in a limiting sense. Consequently, the scope of the invention should be determined by the appended claims and their legal equivalents.

What is claimed is:

1. A vault, comprising:

a chamber having an interior space, wherein the chamber comprises a first wall and a second wall defining at least one opening to the interior space and an end portion of the first wall includes a first recess; and at least one vault door coupled to the chamber to open or close the interior space of the chamber, wherein the at least one vault door comprises a rear panel and a front slab slidably coupled to the rear panel, wherein the front slab is configured to slide in a linear direction relative to the rear panel such that a first edge portion of the front slab engages within the first recess at a closed and engaged position, thereby forming a direct interlocking engagement with the first wall to secure the at least one vault door, and wherein the front slab is configured to completely cover the at least one opening of the chamber at the closed and engaged position.

2. The vault of claim 1 wherein an end portion of the second wall includes a second recess, and the front slab is configured to slide in an opposite linear direction relative to the rear panel to make a second edge portion of the front slab fit into the second recess at a closed and disengaged position.

3. The vault of claim 2 wherein the front slab is configured to engage the first edge portion with the first recess while the second edge portion is partially engaged with the second recess, and is configured to engage the second edge portion with the second recess while the first edge portion is disengaged from the first recess.

4. The vault of claim 2 wherein the first and second recesses are located outside the opening of the chamber.

5. The vault of claim 2 further comprising at least one hinge for coupling the at least one vault door to the chamber to open or close the interior space of the chamber, wherein the hinge is placed at the second wall.

6. The vault of claim 1 wherein the rear panel is configured to be placed inside the interior space at the closed and engaged position.

7. The vault of claim 1 further comprising a guider installed in the rear panel and/or the front slab, wherein the guider is configured to guide a movement of the front slab relative to the rear panel.

8. The vault of claim 7 further comprising a handle installed in the vault door and coupled to the guider to drive the movement of the front slab relative to the rear panel.

9. The vault of claim 7 wherein the guider comprises a gear rack and a pinion gear coupled to the gear rack and the handle.

10. The vault of claim 7 further comprising at least one lock system installed in the rear panel and/or the front slab, and configured to lock or unlock the movement of the front slab relative to the rear panel.

11. The vault of claim 10 wherein the at least one lock system comprises a combination lock.

12. The vault of claim 1 further comprising at least one hinge for coupling the at least one vault door to the chamber to open or close the interior space of the chamber.

13. A vault door system coupled to a chamber to open or close an interior space of the chamber wherein the chamber comprises a first wall and a second wall defining an opening to the interior space and having a first recess at an end portion of the first wall and a second recess at an end portion of a second wall, comprising:

a rear panel;

a front slab slidably coupled to the rear panel, wherein the front slab is configured to slide in a linear direction relative to the rear panel such that a first edge portion of the front slab engages within the first recess at a closed and engaged position thereby forming a direct interlocking engagement with the first wall to secure the vault door system, wherein the first slab is configured to slide in an opposite linear direction relative to the rear panel such that a second edge portion of the front slab engages within the second recess at a closed and disengaged position, and wherein the interlocking engagement between the front slab and the first recess provides enhanced resistance against prying, impact, or heat transfer at the perimeter of the vault door system, the front slab being configured to completely cover the opening of the chamber at the closed and engaged position to form a continuous, tamper-resistant exterior surface; and a guider installed in the rear panel and/or the front slab, wherein the guider is configured to guide a movement of the front slab relative to the rear panel.

14. The vault door system of claim 13 wherein the front slab is configured to engage the first edge portion with the first recess while the second edge portion is partially engaged with the second recess and is configured to engage the second edge portion with the second recess while the first edge portion is disengaged from the first recess.

15. The vault door system of claim 13 wherein the rear panel is configured to be placed inside the interior space at the closed and engaged position.

16. The vault door system of claim 13 further comprising a handle installed in the front slab and coupled to the guider to drive the movement of the front slab relative to the rear panel.

17. The vault door system of claim 16 wherein the guider comprises a gear rack and a pinion gear coupled to the gear rack and the handle.

18. The vault door system of claim 13 further comprising at least one lock system installed in the rear panel and/or the front slab, and configured to lock or unlock the movement of the front slab relative to the rear panel.

19. The vault door system of claim 18 wherein the at least one lock system comprises a combination lock.

* * * * *